US012078186B2

(12) United States Patent
Zhang et al.

(10) Patent No.: US 12,078,186 B2
(45) Date of Patent: Sep. 3, 2024

(54) LOCKING STRUCTURE OF COMPRESSOR IMPELLER AND INSTALLATION METHOD, CENTRIFUGAL COMPRESSOR AND REFRIGERATION SYSTEM

(71) Applicant: Carrier Corporation, Palm Beach Gardens, FL (US)

(72) Inventors: Huiliang Zhang, Shanghai (CN); Kai Deng, Shanghai (CN)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 18/153,685

(22) Filed: Jan. 12, 2023

(65) Prior Publication Data

US 2023/0228276 A1    Jul. 20, 2023

(30) Foreign Application Priority Data

Jan. 14, 2022   (CN) .......................... 202210043508.4

(51) Int. Cl.
*F04D 29/26*   (2006.01)
*F04D 29/28*   (2006.01)

(52) U.S. Cl.
CPC ......... *F04D 29/266* (2013.01); *F04D 29/284* (2013.01)

(58) Field of Classification Search
CPC ...... F04D 29/284; F04D 29/266; F04D 17/10; F04D 29/26; F04D 29/28; B63H 23/34; F16B 37/00; F16B 39/02; F16B 39/10; F16B 37/14; F05B 2260/31; F05D 2260/31

USPC ................................. 411/374, 140, 119, 120
See application file for complete search history.

(56) References Cited

U.S. PATENT DOCUMENTS 3,698,836 A * 10/1972 Herbage .................. B63H 1/20
                                                    416/244 R
4,086,946 A *  5/1978 Keen ...................... F16C 35/063
                                                    411/937.2

FOREIGN PATENT DOCUMENTS

CN       202228420 U  *  5/2012
CN       104533831 A  *  4/2015
CN       205663649 U  * 10/2016

* cited by examiner

*Primary Examiner* — Christopher Verdier
*Assistant Examiner* — Arthur Paul Golik
(74) *Attorney, Agent, or Firm* — CANTOR COLBURN LLP

(57) ABSTRACT

A locking structure of a compressor impeller, which includes: a rotary shaft; a lock nut arranged on an end of the rotary shaft by means of a threaded connection and provided with waist-shaped holes extending along a circumferential direction thereof; an impeller sleeved on the end of the rotary shaft and located on an inner side of the lock nut, the impeller is provided with threaded holes in communication with the waist-shaped holes of the lock nut; a nose piece located on an outer side of the lock nut and provided with through holes in communication with the waist-shaped holes of the lock nut; and bolts passing through the through holes and the waist-shaped holes in turn into the threaded holes, thereby fixing the nose piece, the lock nut and the impeller together.

11 Claims, 3 Drawing Sheets

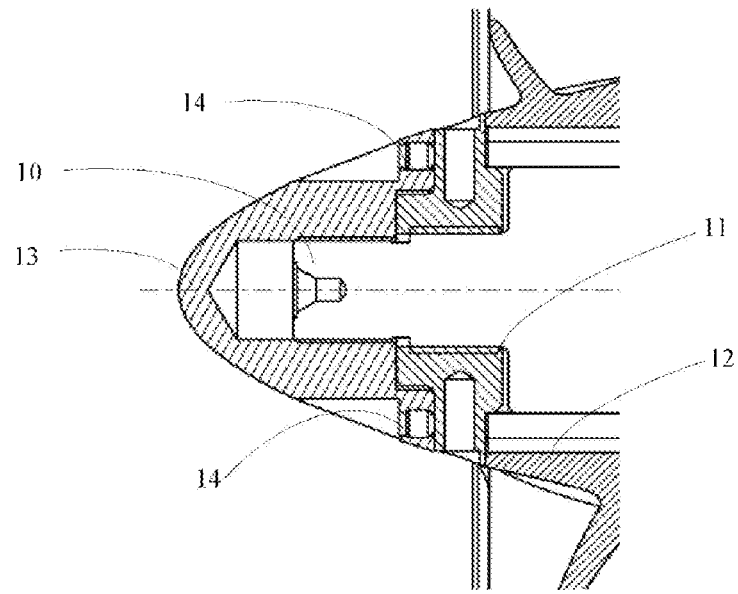
Figure 1 - PRIOR ART
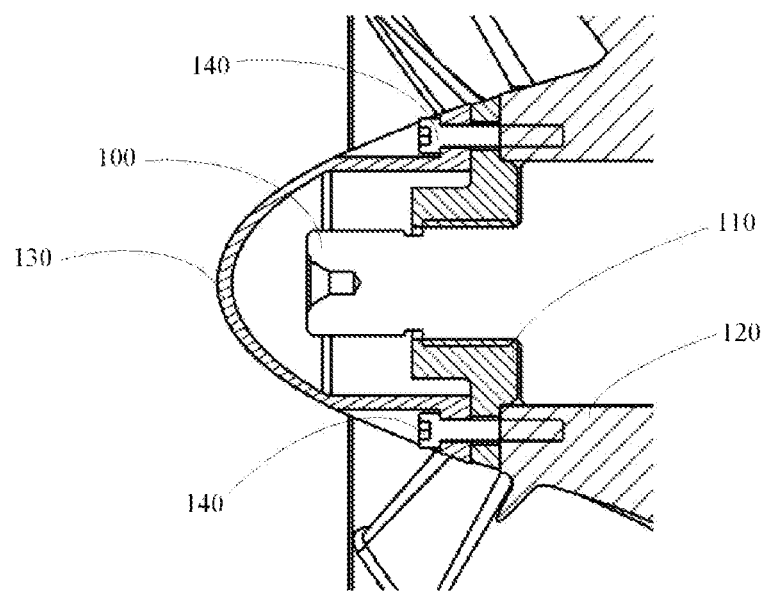
Figure 2

LOCKING STRUCTURE OF COMPRESSOR IMPELLER AND INSTALLATION METHOD, CENTRIFUGAL COMPRESSOR AND REFRIGERATION SYSTEM

FOREIGN PRIORITY

This application claims priority to Chinese Patent Application No. 202210043508.4, filed Jan. 14, 2022, and all the benefits accruing therefrom under 35 U.S.C. § 119, the contents of which in its entirety are herein incorporated by reference.

TECHNICAL FIELD OF INVENTION

The present invention relates to the technical field of refrigeration, in particular to a locking structure of a compressor impeller, and also relates to a centrifugal compressor provided with the locking structure of a compressor impeller, a refrigeration system configured with the centrifugal compressor, and an installation method for the locking structure of a compressor impeller.

BACKGROUND OF THE INVENTION

At present, compressor is a kind of fluid machinery which boosts low-pressure gas into high-pressure gas. It sucks low-temperature and low-pressure refrigerant gas from the air suction pipe, boosts it by driving the impeller through motor operation, and discharges high-temperature and high-pressure refrigerant gas from the air exhaust pipe, so as to provide power for the refrigeration cycle.

The locking structure of a compressor impeller is an important component inside the compressor, which includes a lock nut 11, an impeller 12 and a nose piece 13. The impeller 12 (also referred to as the running wheel) is sleeved on the end of a rotary shaft 10, and it is the only component inside the compressor that applies work to the air flow. In the prior art, the nose piece 13 is in threaded connection with the rotary shaft 10, so the nose piece 13 is generally designed to be thicker and its weight cannot be reduced. In addition, the lock nut 11 is mounted on the rotary shaft 10 by means of a threaded connection. Therefore, in addition to designing the right-hand threads for the lock nut 11, the rotary shaft 10 also has to additionally design the left-hand threads for the nose piece 13, thus resulting in a more complex processing method for the rotary shaft 10. On the other hand, the operating personnel need to drill a hole 14 in the installation site so to secure the nose piece 13 to the lock nut 11, which brings a lot of difficulties to on-site installation and maintenance.

SUMMARY OF THE INVENTION

In view of the above, according to a first aspect of the present invention, a locking structure of a compressor impeller is provided, which effectively solves the above problems and problems in other aspects existing in the prior art. In the locking structure for a compressor impeller according to the present invention, it comprises: a rotary shaft; a lock nut, arranged on an end of the rotary shaft by means of a threaded connection and provided with waist-shaped holes extending along a circumferential direction thereof; an impeller, sleeved on the end of the rotary shaft and located on an inner side of the lock nut, wherein the impeller is provided with threaded holes in communication with the waist-shaped holes of the lock nut; a nose piece, located on an outer side of the lock nut and provided with through holes in communication with the waist-shaped holes of the lock nut; and bolts, passing through the through holes and the waist-shaped holes in turn into the threaded holes, thereby fixing the nose piece, the lock nut and the impeller together.

In another embodiment of the locking structure of a compressor impeller according to the present invention, a plurality of threaded holes are provided and are arranged at equal intervals along the circumferential direction of the impeller; a plurality of through holes are provided and are arranged at equal intervals along the circumferential direction of the nose piece; and a plurality of waist-shaped holes are provided and are arranged at equal intervals along the circumferential direction of the lock nut.

In yet another embodiment of the locking structure of a compressor impeller according to the present invention, the number of the through holes is the same as the number of the waist-shaped holes, and the number of the threaded holes is twice the number of the waist-shaped holes.

In still another embodiment of the locking structure of a compressor impeller according to the present invention, the number of through holes and the number of waist-shaped holes are four, five, six, seven or eight.

In a further embodiment of the locking structure of a compressor impeller according to the present invention, the end of the rotary shaft is provided with a shoulder, wherein the inner side of the lock nut abuts against the shoulder, and the impeller is sleeved on the shoulder of the rotary shaft.

In another embodiment of the locking structure of a compressor impeller according to the present invention, the center line of the bolt is parallel to the axis of the rotary shaft.

In yet another embodiment of the locking structure of a compressor impeller according to the present invention, the impeller and the nose piece are made of aluminum alloys.

In still another embodiment of the locking structure of a compressor impeller according to the present invention, the inner wall of the nose piece is not in contact with the end of the rotary shaft.

In addition, according to a second aspect of the present invention, a centrifugal compressor is further provided, wherein the centrifugal compressor is provided with the aforementioned locking structure of a compressor impeller.

Furthermore, according to a third aspect of the present invention, a refrigeration system is further provided, wherein the refrigeration system is configured with the aforementioned centrifugal compressor.

Still further, according to a fourth aspect of the present invention, an installation method for the locking structure of a compressor impeller is further provided, which comprises: S1: sleeving the impeller on the end of the rotary shaft; S2: arranging the lock nut on the end of the rotary shaft by means of a threaded connection; S3: arranging the nose piece on the outer side of the lock nut; and S4: making the bolts pass through the through holes and the waist-shaped holes in turn into the threaded holes, thereby fixing the nose piece, the lock nut and the impeller together.

It can be appreciated that the locking structure of a compressor impeller according to the present invention can avoid drilling holes in the installation site, thus facilitating on-site installation and maintenance. In addition, since there is no need for a threaded connection between the nose piece and the rotary shaft of the locking structure of a compressor impeller, the nose piece can be designed to be as thin as possible, thereby greatly reducing the weight of the nose piece.

BRIEF DESCRIPTION OF THE DRAWINGS

The technical solutions of the present invention will be described in further detail below in conjunction with the accompanying drawings and embodiments, where:

FIG. 1 is a local cross-sectional schematic diagram of a locking structure of a compressor impeller according to the prior art;

FIG. 2 is a local cross-sectional schematic diagram of a locking structure of a compressor impeller according to an embodiment of the present invention;

DETAILED DESCRIPTION OF THE INVENTION

Some embodiments of the present invention will be described in detail below with reference to the accompanying drawings. It should be noted that orientation terms such as upper, lower, left, right, front, rear, inner side, outer side, top, bottom, etc. mentioned or possibly mentioned in this specification are defined relative to the configurations illustrated in the respective drawings. They are relative concepts, so they may change accordingly according to their different locations and different states of use. Therefore, these and other orientation terms shall not be construed as restrictive terms.

Figure 3:
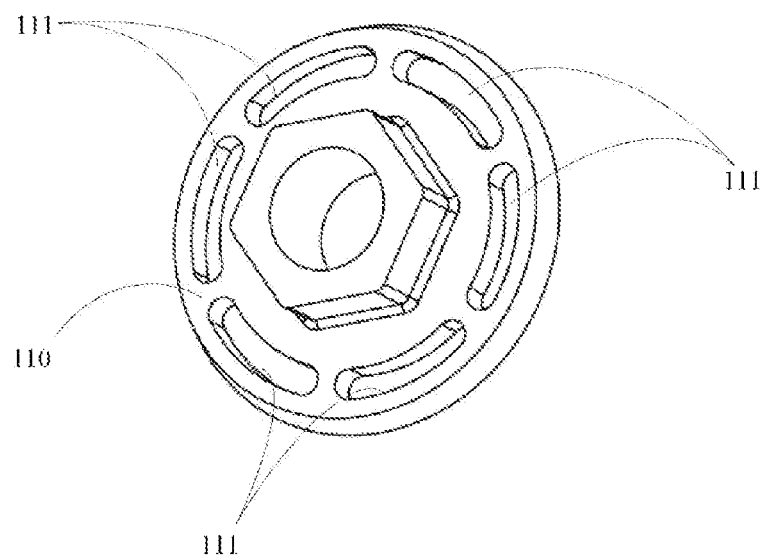
FIG. 3 is a structural schematic diagram of the lock nut of the locking structure of a compressor impeller in FIG. 2.
Figure 4:
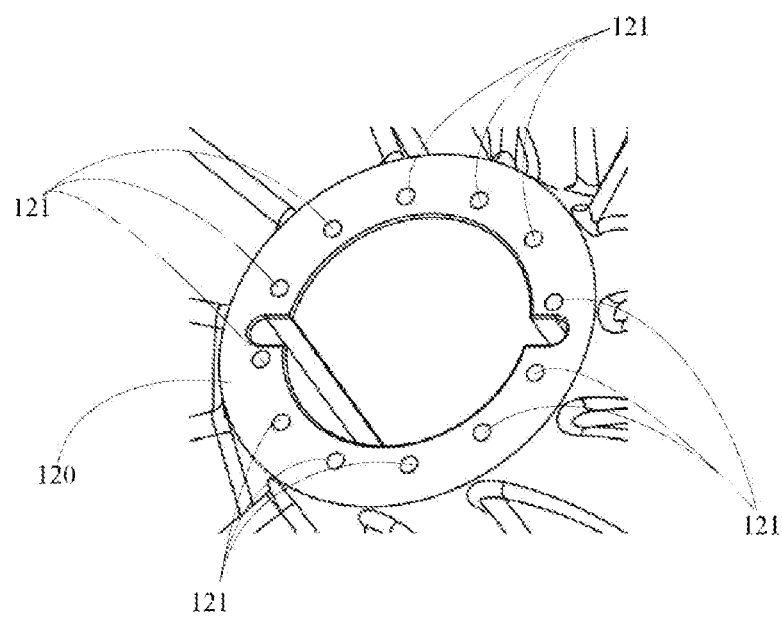
FIG. 4 is a local structural schematic diagram of the impeller of the locking structure of a compressor impeller in FIG. 2.
Figure 5:
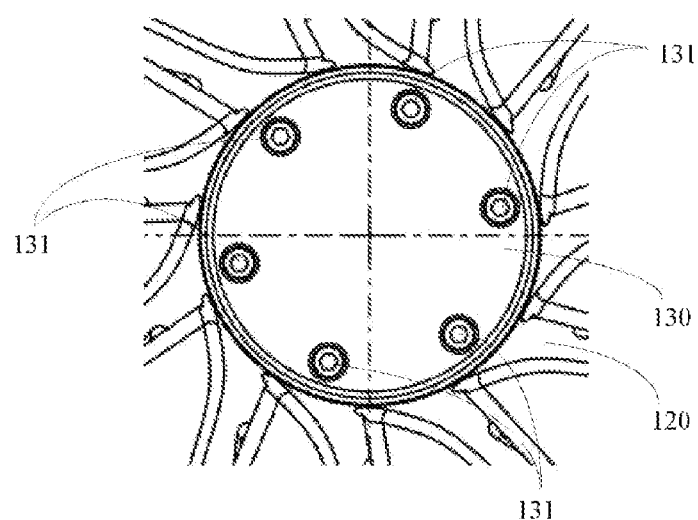
FIG. 5 is a local structural schematic diagram of the locking structure of a compressor impeller in FIG. 2 viewed from the direction of the nose piece.

FIG. 2 schematically illustrates in general the structure of an embodiment of a locking structure of a compressor impeller according to the present invention. As can be explicitly seen from FIGS. 2 to 5, the locking structure of a compressor impeller is composed of a rotary shaft 100, a lock nut 110, an impeller 120, a nose piece 130, bolts 140 and other components. The lock nut 110 is arranged on the end of the rotary shaft 100 by means of a threaded connection, and the lock nut 110 is provided with waist-shaped (e.g., elongated) holes 111 extending along its circumferential direction. The impeller 120 is sleeved on the end of the rotary shaft 100, and it is the only component inside the compressor that is in contact with and applies work to the air. Since the impeller 120 needs to operate continuously at the high speed of over a thousand revolutions per minute for several hours, it therefore needs to be made of high-strength materials such as aluminum alloys. As shown in the figures, the impeller 120 is located on the inner side of the lock nut 110 and is provided with threaded holes 121 that are in communication with the waist-shaped holes 111 of the lock nut 110. The nose piece 130 is located on the outer side of the lock nut 110, so as to help the impeller 120 to maintain balance and reduce aerodynamic resistance. The nose piece 130 is provided with through holes 131 that are in communication with the waist-shaped holes 111 of the lock nut 110. The bolts 140 pass through the through holes 131 and the waist-shaped holes 111 in turn into the threaded holes 121, thereby fixing the nose piece 130, the lock nut 110 and the impeller 120 together. It should be noted that during assembly, the lock nut 110 is prone to circumferential rotation, so the lock nut 110 is designed with waist-shaped holes to reserve sufficient positions for installation, so that the threaded holes 121 and the through holes 131 can be aligned when the lock nut 110 is rotated in a circumferential direction.

Referring also to FIGS. 2 to 5, a plurality of threaded holes 121 are provided, which are arranged at equal intervals along the circumferential direction of the impeller 120. A plurality of through holes 131 are provided, which are arranged at equal intervals along the circumferential direction of the nose piece 130. A plurality of waist-shaped holes 111 are provided, which are arranged at equal intervals along the circumferential direction of the lock nut 110. That is, the centers of the plurality of threaded holes 121, the centers of the plurality of through holes 131, and the centers of the plurality of waist-shaped holes 111 shall be arranged on a concentric circle centered at the axis of the rotary shaft 100, so that the threaded holes 121 and the through holes 131 can be aligned during installation. For example, the center line of the bolt 140 is parallel to the axis of the rotary shaft 100. In addition, it is easy to understand by those skilled in the art that the number of the through holes 131 may be the same as the number of the waist-shaped holes 111, and that the number of the threaded holes 121 is twice the number of the waist-shaped holes 111. Further, the number of the through holes 131 and the number of the waist-shaped holes 111 can be four, five, six, seven or eight.

In conjunction with the above embodiment, in other preferred embodiments, the end of the rotary shaft 100 is provided with a shoulder, wherein the inner side of the lock nut 110 abuts against the shoulder, and the impeller 120 is sleeved on the shoulder of the rotary shaft 100 to facilitate installation.

It should be noted that the inner wall of the nose piece 130 is not in contact with the end of the rotary shaft 100. That is, there is a certain space between the inner wall of the nose piece 130 and the end of the rotary shaft 100, so that the nose piece 130 can be designed as thin as possible, thereby greatly reducing the weight of the nose piece 130. In addition, since the rotary shaft 100 does not need to be in threaded connection with the nose piece 130, the processing method of the rotary shaft 100 becomes simpler. Furthermore, similar to the impeller 120, the nose piece 130 can also be made of high-strength materials such as aluminum alloys.

In addition, the present invention also provides a centrifugal compressor configured with a locking structure of a compressor impeller according to the various embodiments. Furthermore, the present invention further provides a refrigeration system configured with the aforementioned centrifugal compressor. The refrigeration system may comprise a cooling tower, a water chiller, a pump assembly, and the like connected through pipelines, wherein the water chiller is composed of a centrifugal compressor, a condenser, a throttling assembly, an evaporator, and the like. As noted earlier, the installation can be significantly simplified and the maintenance costs be greatly reduced by installing the centrifugal compressor mentioned above. Therefore, it is highly recommended that the aforementioned centrifugal compressors be widely applied to various refrigeration systems.

Furthermore, the present invention further proposes an installation method for the aforementioned locking structure of a compressor impeller, which comprises: S1: sleeving the impeller 120 on the end of the rotary shaft 100; S2: arranging the lock nut 110 on the end of the rotary shaft 100 by means of a threaded connection; S3: arranging the nose piece 130 on the outer side of the lock nut 110; and S4: making the bolts 140 pass through the through holes 131 and the waist-shaped holes 111 in turn into the threaded holes 121, thereby fixing the nose piece 130, the lock nut 110 and the impeller 120 together.

In summary, the locking structure of a compressor impeller and the installation method therefor according to the present invention can avoid drilling holes in the installation site, thus facilitating on-site installation and maintenance. In addition, the nose piece of the locking structure of a compressor impeller can be designed to be as thin as possible, thereby greatly reducing its weight.

The specific embodiments described above are merely intended to describe the principles of the present invention more clearly, wherein various components are clearly shown or described to facilitate the understanding of the principles of the present invention. Those skilled in the art may, without departing from the scope of the present invention, make various modifications or changes to the present invention. Therefore, it should be understood that these modifications or changes should be included within the scope of patent protection of the present invention.

What is claimed is:

1. A locking structure of a compressor impeller, comprising:
   a rotary shaft;
   a lock nut, arranged on an end of the rotary shaft by means of a threaded connection and provided with elongated holes extending along a circumferential direction thereof;
   an impeller, sleeved on the end of the rotary shaft and located on an inner side of the lock nut, wherein the impeller is provided with threaded holes in communication with the elongated holes of the lock nut;
   a nose piece, located on an outer side of the lock nut and provided with through holes in communication with the elongated holes of the lock nut; and
   bolts, passing through the through holes and the elongated holes in turn into the threaded holes, thereby fixing the nose piece, the lock nut and the impeller together.

2. The locking structure of the compressor impeller according to claim 1, wherein the threaded holes are arranged at equal intervals along a circumferential direction of the impeller; the through holes are arranged at equal intervals along a circumferential direction of the nose piece; and the elongated holes are arranged at equal intervals along a circumferential direction of the lock nut.

3. The locking structure of the compressor impeller according to claim 2, wherein the number of the through holes is the same as the number of the elongated holes, and the number of the threaded holes is twice the number of the elongated holes.

4. The locking structure of the compressor impeller according to claim 3, wherein the number of the through holes and the number of elongated holes are four, five, six, seven or eight.

5. The locking structure of the compressor impeller according to claim 1, wherein the end of the rotary shaft is provided with a shoulder, and wherein the inner side of the lock nut abuts against the shoulder, and the impeller is sleeved on the shoulder of the rotary shaft.

6. The locking structure of the compressor impeller according to claim 1, wherein a center line of each of the respective bolts is parallel to an axis of the rotary shaft.

7. The locking structure of the compressor impeller according to claim 1, wherein the impeller and the nose piece are made of aluminum alloys.

8. The locking structure of the compressor impeller according to claim 1, wherein an inner wall of the nose piece is not in contact with the end of the rotary shaft.

9. A centrifugal compressor, wherein the centrifugal compressor is provided with the locking structure of the compressor impeller according to claim 1.

10. A refrigeration system, wherein the refrigeration system is configured with the centrifugal compressor according to claim 9.

11. An installation method for the locking structure of the compressor impeller according to claim 1, comprising:
   S1: sleeving the impeller on the end of the rotary shaft;
   S2: arranging the lock nut on the end of the rotary shaft by means of a threaded connection;
   S3: arranging the nose piece on the outer side of the lock nut; and
   S4: making the bolts pass through the through holes and the elongated holes in turn into the threaded holes, thereby fixing the nose piece, the lock nut and the impeller together.

* * * * *